United States Patent
Schlaudraff

(10) Patent No.: US 10,513,175 B2
(45) Date of Patent: Dec. 24, 2019

(54) METHOD FOR OPERATING A COVERING APPARATUS FOR COVERING A CONNECTION ELEMENT OF A MOTOR VEHICLE, RELEASE DEVICE, AND MOTOR VEHICLE

(71) Applicant: AUDI AG, Ingolstadt (DE)

(72) Inventor: Andreas Schlaudraff, München (DE)

(73) Assignee: AUDI AG, Ingolstadt (DE)

(*) Notice: Subject to any disclaimer, the term of this patent is extended or adjusted under 35 U.S.C. 154(b) by 58 days.

(21) Appl. No.: 15/987,994

(22) Filed: May 24, 2018

(65) Prior Publication Data
US 2018/0354359 A1      Dec. 13, 2018

(30) Foreign Application Priority Data

Jun. 8, 2017  (DE) .......................... 10 2017 209 713

(51) Int. Cl.
*B62D 25/00*       (2006.01)
*B60K 15/05*       (2006.01)
(Continued)

(52) U.S. Cl.
CPC .............. *B60K 15/05* (2013.01); *B60L 53/14* (2019.02); *B60L 53/30* (2019.02); *B60L 53/66* (2019.02);
(Continued)

(58) Field of Classification Search
CPC ............ Y02T 10/7005; Y02T 10/6217; Y02T 10/7077; Y02T 10/641; A61M 5/14276;
(Continued)

(56) References Cited

U.S. PATENT DOCUMENTS 6,834,688 B2 * 12/2004 Ono .......................... F17C 6/00
                                                          141/94
7,347,191 B2 *  3/2008 Atwood ............... B60K 15/035
                                                          123/516
(Continued)

FOREIGN PATENT DOCUMENTS

DE           19935454 A1    3/2001
DE       102010006211 A1    8/2011
(Continued)

OTHER PUBLICATIONS

German Office Action dated May 15, 2018, in connection with corresponding DE Application No. 10 2017 209 713.2 (10 pgs.).

*Primary Examiner* — Kiran B Patel
(74) *Attorney, Agent, or Firm* — Maier & Maier, PLLC

(57) ABSTRACT

A method for operating a covering apparatus for covering a connection element of a motor vehicle. The connection element is designed as a junction between an energy delivery apparatus external to the motor vehicle and an energy storage unit and is designed for filling and/or recharging the energy storage unit with an energy source. The covering apparatus can preferably be designed as a charging flap or as a fuel tank cover. A release device carries out the following: determination that the motor vehicle is located within a predetermined radius of the energy delivery apparatus; generation of a release signal, which describes a release of an access to the connection element through opening of the covering apparatus.

10 Claims, 1 Drawing Sheet

(51) Int. Cl.
  *B60L 53/30* (2019.01)
  *B60L 53/66* (2019.01)
  *B60L 53/14* (2019.01)
  *B60L 53/31* (2019.01)
(52) U.S. Cl.
  CPC ....... *B60K 2015/0538* (2013.01); *B60L 53/31* (2019.02); *B60L 2240/622* (2013.01)
(58) Field of Classification Search
  CPC ....... B60W 10/06; B60K 17/046; B60K 1/02; H02K 7/116; E05Y 2900/55
  See application file for complete search history.

(56) References Cited

U.S. PATENT DOCUMENTS

| | | | | |
|---|---|---|---|---|
| 7,766,410 | B2* | 8/2010 | Tseng | B60K 15/05 296/97.22 |
| 9,515,418 | B2* | 12/2016 | Yoshizawa | B60K 1/04 |
| 9,809,107 | B2* | 11/2017 | Shibata | B60K 6/365 |
| 10,343,515 | B2* | 7/2019 | Kim | B60K 15/03006 |
| 10,384,553 | B2* | 8/2019 | Sarkar | B60L 53/32 |
| 10,442,290 | B2* | 10/2019 | Khafagy | E06B 3/38 |
| 2011/0066515 | A1* | 3/2011 | Horvath | G06Q 20/204 705/17 |
| 2012/0041855 | A1* | 2/2012 | Sterling | B60L 3/0046 705/34 |
| 2012/0074891 | A1* | 3/2012 | Anderson | H02J 7/0042 320/101 |
| 2012/0153661 | A1* | 6/2012 | Woodworth | B60K 15/05 296/97.22 |
| 2013/0110296 | A1* | 5/2013 | Khoo | G06F 1/26 700/286 |
| 2013/0134737 | A1* | 5/2013 | Ogata | B60K 15/05 296/97.22 |
| 2013/0193918 | A1* | 8/2013 | Sarkar | B60L 3/04 320/109 |
| 2013/0257089 | A1* | 10/2013 | Minock | B60K 15/05 296/97.22 |
| 2014/0070561 | A1* | 3/2014 | Jakobs | B60K 15/03177 296/97.22 |
| 2015/0048644 | A1* | 2/2015 | Georgi | B60K 15/05 296/97.22 |
| 2015/0127479 | A1* | 5/2015 | Penilla | G06Q 20/18 705/26.1 |
| 2016/0023564 | A1* | 1/2016 | Warner | B60L 53/11 320/109 |
| 2016/0272074 | A1* | 9/2016 | McGrath | B60L 5/42 |
| 2017/0355270 | A1* | 12/2017 | Elshaer | B60L 53/12 |
| 2018/0339597 | A1* | 11/2018 | Kruszelnicki | B60L 11/1818 |
| 2018/0339601 | A1* | 11/2018 | Kruszelnicki | B60L 11/1833 |
| 2018/0345807 | A1* | 12/2018 | Cun | H02J 7/0021 |
| 2018/0345808 | A1* | 12/2018 | Cun | H02J 7/0021 |
| 2018/0354383 | A1* | 12/2018 | Namou | B60L 53/12 |
| 2019/0210468 | A1* | 7/2019 | Wittl | B60L 53/16 |

FOREIGN PATENT DOCUMENTS

| | | |
|---|---|---|
| DE | 102015213160 A1 | 1/2017 |
| DE | 10 2015 120 233 A1 | 5/2017 |
| WO | 2013-041133 A1 | 3/2013 |

* cited by examiner

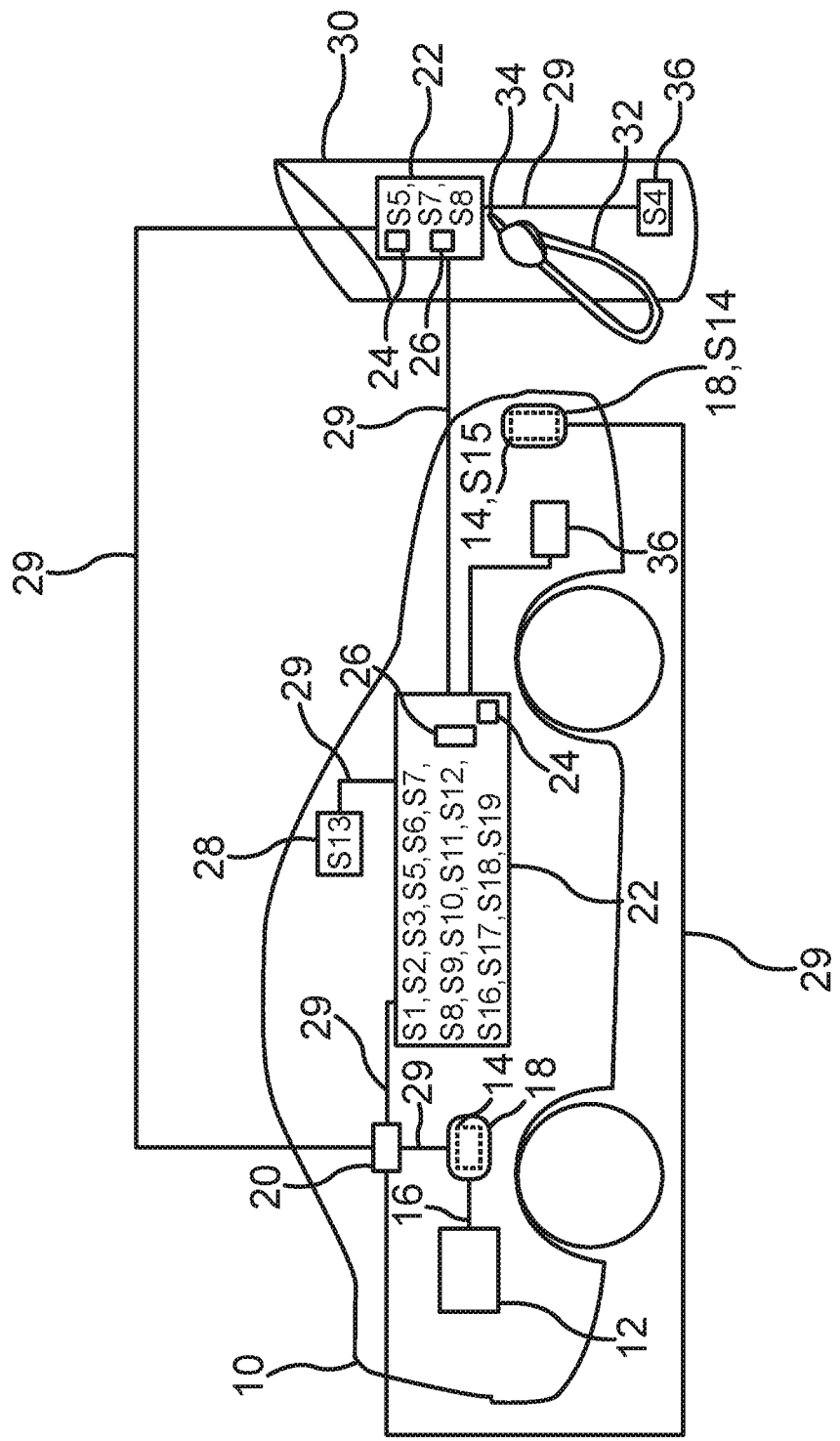

METHOD FOR OPERATING A COVERING APPARATUS FOR COVERING A CONNECTION ELEMENT OF A MOTOR VEHICLE, RELEASE DEVICE, AND MOTOR VEHICLE

FIELD

The invention relates to a method for operating a covering apparatus for covering a connection element of a motor vehicle, wherein the connection element is designed as an interface or junction between an energy delivery apparatus external to the motor vehicle, such as, for example, a charging station or a fuel pump, and an energy storage unit, and is designed for filling and/or recharging the energy storage unit with an energy source. In this case, the covering apparatus can preferably be designed as a charging flap and/or as a fuel tank cover. The connection element can be designed, for example, as an electric plug connector for a charging cable of the energy delivery apparatus external to the motor vehicle, and/or as a fuel tank neck for a fuel pump nozzle of a fuel pump. In accordance herewith, the energy storage unit can be designed, for example, as a fuel tank and/or as a battery, for example, as a rechargeable battery or traction battery.

BACKGROUND

When a motor vehicle is driven to a public charging pole, for example, or is driven into a charging park or into a filling station, the user of the motor vehicle parks in front of or next to the charging pole or fuel pump, steps out, and opens the covering apparatus, that is, for example, the charging flap or fuel tank cover in order to connect the charging cable or the fuel pump nozzle to the motor vehicle.

In many motor vehicles, the covering apparatus is still opened manually, but ever more often it can be opened electrically. When, for example, a pushbutton is pressed, it is possible, for example, to lower a charging flap and release the charging socket in order to plug in the charging cable.

Before plugging in the charging cable or before inserting the fuel pump nozzle, the user of the motor vehicle first has to step out and then go to the covering apparatus and either open it completely or flip it open completely in order that an access to the connection element is freed. If the user of the motor vehicle is especially in a hurry, this process can cost unnecessary time.

DE 10 2015 213 160 A1 describes a robot for automatically plugging a charging plug into an interface of a vehicle. This presupposes that such a robot is present at the charging station or filling station and is available immediately.

DE 10 2010 006 211 A1 describes a vehicle having flap that closes automatically due to a closing command, wherein the flap can be controlled by use of an operating switch.

Known from DE 199 35 454 A1 is a device for automatically opening and closing a filling neck of a motor vehicle, wherein a tank flap can be moved mechanically.

The drawbacks mentioned above cannot be improved by means of these methods.

SUMMARY

An object on which the invention is based is to reduce the effort required for operating the covering apparatus prior to a tank filling operation or a recharging operation.

The invention is based on the idea of operating the covering apparatus by means of a release device depending on a distance of the motor vehicle from the energy delivery apparatus. For this purpose, it is established first of all that the motor vehicle is located within a predetermined radius with respect to the energy delivery apparatus, after which the release device generates a release signal and transmits it to a control device of the covering apparatus, wherein the release signal describes an opening of the covering apparatus and, accordingly, the provision of an access to the connection element. In this way, there is a gain in comfort, because the user of the motor vehicle no longer needs to open the charging flap or the fuel tank cover, but rather needs only to insert the fuel pump nozzle or plug in the charging cable.

The method according to the invention for operating a covering apparatus for covering a connection element of a motor vehicle, wherein the connection element is designed as an interface or a junction between an energy delivery apparatus external to the motor vehicle and an energy storage unit and is designed for filling and/or recharging the energy storage unit with an energy source, comprises the following steps, which are carried out by a release device. In this case, a release device is understood to mean a device or a component of a device that is designed and set up for electronic data processing and for generation of a release signal, and can be designed, for example, as a control device or a control circuit board.

Through the release device, there initially occurs a determination that the motor vehicle is located within a predetermined radius of the energy delivery apparatus. There then follows a generation of a release signal, which describes a release of an access to the connection element by opening the covering apparatus and a transmission of the release signal to a control device of the motor vehicle, wherein the control device is set up for controlling the covering apparatus. The control device can be designed, for example, as a control unit or a control circuit board of the motor vehicle.

The advantages mentioned above thereby ensue. The user no longer needs to open the covering apparatus manually, and, as a result, gains time and consequently comfort. Through the method according to the invention, it is no longer necessary to provide an operating element, for example, a pushbutton, in the motor vehicle for opening the covering apparatus. It is thereby also possible to prevent an inadvertent opening of the covering apparatus owing to inadvertent operation of the operating element. Beyond this, at the charging station or at a filling station, the user of the motor vehicle has a special experience and the acceptance of electromobility is increased. If the user of the motor vehicle receives an indication as to which charging flap has been opened, this assists the user in a parking operation, because the user already knows proactively which charging flap is best suited for the charging operation.

In accordance with a preferred embodiment of the method according to the invention, the release device can be a release device of the motor vehicle and can carry out the following steps. Through the release device, it is possible to provide information that can describe a location of the energy delivery apparatus. For this purpose, the release device can receive, for example, a positional signal, such as, for example, a GPS signal, which can describe the location, or it can make available and/or evaluate map information obtained from digital map data, for example. There then follows a comparison of the described location of the energy delivery apparatus with a current, geographic position of the motor vehicle. The determination that the motor vehicle is located within the predetermined radius of the energy delivery apparatus can then be made depending on an outcome of the comparison. Accordingly, the method according to the invention takes place on the motor vehicle side, and a special technical design of the energy delivery apparatus is no longer necessary. The method according to the invention can accordingly take place at very many more energy delivery devices.

Alternatively or additionally, in accordance with another embodiment of the method according to the invention, it can be provided that the determination that the motor vehicle is located within the predetermined radius of the energy delivery apparatus can be made by detecting the motor vehicle within the predetermined radius by way of a detection device of the energy delivery apparatus. A detection device is understood here to mean a device or component that is designed for detecting objects, in particular motor vehicles, and, for this purpose, can have a suitable sensor, for example. In this case, by way of example, the detection device can have, for example, a radar and/or LiDAR and/or a laser. In this advantageous embodiment of the method according to the invention, the method according to the invention can also be carried out in the case when, for example, the motor vehicle does not have current map data at its disposal or—for example, in very bad weather—a reception of positional signals is markedly reduced. Optionally, a transmission of a corresponding control signal from the charging station to the motor vehicle can be sent, for example, via a wireless data communication link—for example, by means of a transmission technology that may comprise a radio transmission and/or an infrared transmission. For example, the motor vehicle can interpret this command and open the charging flap or fuel tank flap.

Optionally, the release device can carry out a determination of a termination of an energy delivery operation, for example, a termination of the filling of a fuel tank or the recharging of a battery of the motor vehicle. Alternatively or additionally, a determination that the motor vehicle has departed or is departing from the energy delivery apparatus can occur. The departure from the energy delivery apparatus can preferably be established through determination of a predetermined minimum speed of the motor vehicle. For example, the motor vehicle can have a speed sensor and can transmit a corresponding signal to the release device, which, for example, can then read from the received signal that the motor vehicle has exceeded, for example, a minimum speed of one kilometer per hour or five kilometers per hour or has started up.

In many countries, it is relevant that a charging flap or fuel tank flap is closed prior to beginning a drive. Preferably, an embodiment of the method according to the invention can provide that the covering apparatus is able to close prior to starting a drive (for example, prior to or at the time of engaging or switching on an ignition). Preferably, for this reason, the determination of the termination of the energy delivery operation can be carried out. For this purpose, for example, it can be provided that, additionally or alternatively, a sensor can be arranged, for example, at a connecting cable or at a fuel pump nozzle of the energy delivery apparatus and can detect a detachment of a plug connector from the connection element. The termination of the filling of a fuel tank or of the charging of a battery of the motor vehicle can thereby be established, and the covering apparatus can be covered and/or closed prior to starting up the motor vehicle.

Depending on the established termination of the energy delivery operation, a closing signal can be generated, which can describe a covering of the connection element by the covering apparatus, and the release device can transmit the generated closing signal to the control device. Advantageously, the user of the motor vehicle gains even more time, because there is no longer any need to bother about the covering of the connection element or the closing of the covering apparatus. In addition to the advantages already mentioned above, driving comfort is also markedly increased in this way.

Some motor vehicles, in particular electric motor vehicles or hybrid motor vehicles, can have a plurality of connection elements, each with a covering apparatus, wherein the plurality of connection elements can be distributed on different sides of the motor vehicle. In this way, the motor vehicle can be refueled or recharged at a plurality of sides. For application in such motor vehicles, another embodiment of the method according to the invention can provide for carrying out a determination of the motor vehicle side that, for the energy delivery operation, may be facing a connecting element of the energy delivery apparatus, which is designed for connection to the connection element and for delivery of the energy source to the energy storage unit. The connecting element of the energy delivery apparatus can be designed here, for example, as a fuel pump nozzle or as a charging cable with a charging plug, or, in the case that the user of the motor vehicle has brought along a charging cable and wishes to use it, as a plug for attaching the charging cable. It is possible to determine a particular spatial arrangement of a plurality of connection elements on the motor vehicle and, depending on the particular spatial arrangement of the particular connection element, to select at least one of the connection elements that may be located on the motor vehicle side that has been determined. The release signal generated can then describe a release of the covering apparatus that covers the at least one selected connection element. In this way, preferably only the covering apparatus that covers the selected connection element is opened. In other words, only a relevant charging flap or fuel tank cover is opened. This is appropriate when the motor vehicle drives up to a charging pole or fuel pump, which, for example, only allows a charging or refueling at the correct charging flap and/or charging socket or at the correct tank filling neck, for example, due to parking possibilities at the energy delivery apparatus.

In an enhancement, the release device can determine a spatial arrangement of the connecting element of the energy delivery device on the basis of map data, wherein the determination of the motor vehicle side depends on the determined spatial arrangement of the connecting element. It is also taken into consideration in this case that energy delivery apparatuses, as a rule, have the connecting element arranged on one side.

In another, additional or alternative enhancement, a generation of an information signal can be made through the release device and can describe the selected covering apparatus of the selected connection element and its spatial arrangement on the motor vehicle, and the generated information signal can be transmitted to an output device of the motor vehicle for emitting the information signal. An output device is understood here to mean a device or a component of a device for emitting optical and/or acoustic and/or haptic signals, that is, for example, a device or a component of a device for displaying an image content in the case that the information signal is an image signal or a video signal, or, for example, for emitting an information signal, which, for example, can be an audio signal. The display device can have, for example, a speaker and/or a screen. In this way, the user of the motor vehicle is assisted during a parking operation, because the user already knows proactively which charging flap or which fuel tank cover is best suited for the charging or refueling operation.

The object set forth above is also achieved by a release device according to the invention, which is set up to carry out the method steps in accordance with a method of the above-described embodiments of the method according to the invention. The release device can thereby preferably comprise a processor device. A processor device is understood to mean a device or a component for electronic data processing, which preferably can have at least one microcontroller and/or at least one microprocessor. Optionally, the processor device can be set up for the purpose of executing, for example, a program code stored in a data memory unit, wherein, when it is executed by the processor device, the program code is written for the purpose of carrying out the method according to the invention. The release device can be designed, for example, as a control circuit board or as a computer program product. The advantages mentioned above thereby ensue.

The object set forth above is also achieved, thereby attaining the advantages already mentioned, through an embodiment of an energy delivery apparatus according to the invention, which preferably can be designed as a fuel pump or as a charging station. The energy delivery apparatus according to the invention is characterized by an embodiment of the release device according to the invention.

The invention also relates to a motor vehicle, which preferably is designed as an automobile, for example, a passenger car and/or an electric motor vehicle or hybrid motor vehicle. The motor vehicle according to the invention has an energy storage unit and a covering apparatus as well as a connection element, which is designed as a junction between an energy delivery apparatus external to the motor vehicle and is designed for filling and/or recharging the energy storage unit. Here, the energy storage unit can preferably be designed as a fuel tank and/or as a battery unit. The covering apparatus can preferably be designed as a charging flap and/or fuel tank cover and the connection element can preferably be designed as a fuel tank neck and/or connecting plug for a charging cable. The motor vehicle according to the invention is characterized by an embodiment of the release device according to the invention.

BRIEF DESCRIPTION OF THE DRAWING

Exemplary embodiments of the invention are described below. For this purpose, the sole FIGURE shows:

FIG. 1 is a schematic illustration of an embodiment of the method according to the invention, of the release device according to the invention, and of the motor vehicle according to the invention.

DETAILED DESCRIPTION OF THE DRAWING

The exemplary embodiments explained in the following involve preferred embodiments of the invention. In the exemplary embodiments, the described components of the embodiments each represent individual features of the invention that are to be regarded as independent of one another, each of which the invention further develops, also independently of one another, and, accordingly, are also to be regarded, individually or in a different combination from that shown, as belonging to the invention. Furthermore, the described embodiments can also be supplemented by the already described features of the invention.

In the FIGURE, functionally equivalent elements are furnished with the same reference numbers. The FIGURE illustrates, by way of example, the principle of the method according to the invention on the basis of an exemplary embodiment. For this purpose, the FIGURE shows a motor vehicle 10, which, for example, can be designed as an electric motor vehicle or alternatively, for example, as a hybrid motor vehicle or as a motor vehicle having an internal combustion engine. If the motor vehicle 10 is designed, for example, as a motor vehicle 10 with an internal combustion engine, an energy storage unit 12 of the motor vehicle 10 can be designed as a fuel tank and the motor vehicle 10 can have, as a connection element 14, a filling neck or fuel tank neck. A connection 16 between the connection element 14 and the energy storage unit 12 can then be designed, for example, as a pipe or a line, through which the energy storage unit 12 can be refueled. If the motor vehicle 10 is designed, for example, as an electric motor vehicle or as a hybrid motor vehicle, the energy storage unit 12 can be designed, for example, as a traction battery or as a rechargeable battery. The connection element 14 can then be designed, for example, as a charging socket or plug connector for a charging cable, which, for example, can be connected to the energy storage unit 12 via an electric connection as connection 16.

In the exemplary embodiment as an electric motor vehicle or hybrid motor vehicle, a covering apparatus 18 of the motor vehicle 10 can be designed as a charging flap or alternatively, as a fuel tank cover for the variant of the motor vehicle 10 with an internal combustion engine.

The motor vehicle 10 of the FIGURE also has a control device 20, which, for example, can be designed as a control circuit board or control chip of an onboard computer. Optionally, the control device 20 can be a component of the release device 22 of the motor vehicle 10, wherein the release device 22 can be designed, for example, as a control instrument or as a control circuit board of the onboard computer. The release device 22 can optionally have a processor device 24 and/or a memory device 26. The memory device 26 can be designed as a memory unit known to the person skilled in the art—for example, as a memory card or hard disk. The processor device 24 can preferably have at least one microprocessor and/or one microcontroller or it can be designed as a microcontroller and/or a microprocessor.

The exemplary motor vehicle 10 of the FIGURE can optionally have an output device 28, which, for example, can have a screen and/or a speaker and which can be designed, for example, as an instrument cluster or as a screen of a center console. The output device 28 can be connected to the release device 22 via a data communication link 29, wherein the data communication link 29 can be, for example, a wired data communication link, such as, for example, a data bus of the motor vehicle 10, or a wireless data communication link 29, for example, a Bluetooth link or a WLAN link. Additional data communication links 29 are illustrated in the FIGURE as blank connecting lines and are indicated by the reference signs 29.

The method according to the invention can be carried out by a release device 22 of the motor vehicle 10 and/or by a release device 22 of an energy delivery apparatus 30. In other words, the release device 22 of the motor vehicle 10 that is represented in the FIGURE is an optional feature, as is the release device 22 of the energy delivery apparatus 30.

The energy delivery apparatus 30 can be designed, for example, as a fuel pump or, as illustrated in the FIGURE, as a charging station for charging an electric vehicle or a hybrid motor vehicle. The energy delivery apparatus 30, designed as a charging station, can have a charging cable 32, which has a connecting element 34, such as, for example, a connecting plug for insertion into the connection element 14.

The energy delivery apparatus 30 of the FIGURE shows, in addition, an optional detection device 36, which, for example, can have a radar and/or LiDAR and/or an ultrasound sensor and/or a beam sensor, as known to the person skilled in the art. The detection device 36 of the energy delivery apparatus 30 can thereby be designed and set up to detect that the motor vehicle 10 is approaching the energy delivery apparatus 30 and is located within a predetermined radius.

Optionally, the detection device 36 of the motor vehicle 10 can have, by way of example, a speed sensor known from prior art. The detection device 36 of the motor vehicle 10 can detect, alternatively or additionally, for example, an acceleration of the motor vehicle 10 and/or an actuation of the ignition, for which purpose the detection device 36 can have, for example, a terminal 15 of an ignition unit of the motor vehicle 10 and/or an acceleration sensor. An optional sensor for detecting the unplugging of a connecting element 34 from the connection element 14 can also be provided. A corresponding sensor signal can be transmitted to the release device 22.

Alternatively or additionally, the detection device 36 of the motor vehicle 10 can have, for example, a navigation system or a navigation instrument in order to receive and evaluate a positional signal, such as, for example, a GPS signal.

In the example of the FIGURE, for example, a user of the motor vehicle 10 can be on the way to a charging station by way of example, that is, to the energy delivery apparatus 30. On driving into the charging park, for example, the detection device 36 of the motor vehicle 10, which can be designed as a navigation system, can receive a navigation signal, such as, for example, a GPS signal. The navigation signal can describe the current position of the energy delivery apparatus 30 and/or of the motor vehicle 10 by way of, for example, corresponding geographic coordinates. By receiving the exemplary navigation signal, the release device 22 can be provided with information as to the location of the energy delivery apparatus 30 (method step S1). For example, in the scope of a geofencing process, the described location can be compared on the basis of the current position of the motor vehicle 10 (S2). Corresponding algorithms and methods relating to geofencing are known from the prior art to the person skilled in the art. For geofencing, it is possible, by way of example, to use GPS sensor systems already present in a motor vehicle 10. If, for example, an instruction is already on file in the release device 22 that the covering apparatus 18 is to be opened once the motor vehicle 10 is located within a radius of two meters of the energy delivery apparatus 30, then, by use of the comparison S2, it can be established, by way of example, that the condition is met.

Alternatively, the determination that the motor vehicle 10 is located within the predetermined radius, can be made, for example, by means of the detection device 36 of the energy delivery apparatus 30 (S3). The detection device 36 of the energy delivery apparatus 30 can thus have a laser and/or an ultrasound sensor and/or a beam sensor in order to detect the approach of the motor vehicle 10 (S4). The generation of the release signal (S5) can then be made, for example, not through the release device 22 of the motor vehicle 10, but rather, for example, through the release device 22 of the energy delivery apparatus 30. For example, by way of a Bluetooth link or a WLAN link, the release signal can then be transmitted from the release device 22 of the energy delivery apparatus 30 to the control device 20 of the motor vehicle 10 (S6).

In another alternative, for example, the release device 22 of the motor vehicle 10 can receive a release signal from, for example, the release device 22 of the energy delivery apparatus 30 (S6), the generation of which, for example, does not depend on a detection of the motor vehicle 10 by the detection device 36 of the energy delivery apparatus 30 (S4), but which instead transmits, for example, only the information that the energy delivery apparatus 30 is present in the vicinity of the motor vehicle 10. In other words, the [proximity of the] energy delivery apparatus 30 can be communicated to the release device 22 of the motor vehicle 10. Such a release signal can be, for example, a near-field signal, which, for example, can be transmitted through a WLAN interface of the release device 22 of the energy delivery apparatus 30 to, for example, a WLAN interface of the release device 22 of the motor vehicle 10. The predetermined radius can then be, for example, the radius of the energy delivery apparatus 30 in which such a near-field communication is possible. Such an embodiment is especially advantageous in buildings in the case when, for example, the energy delivery apparatus 30 is arranged in a lower level of a parking lot, where, under certain circumstances, the motor vehicle 10 may have no reception of navigation signals. After the generation of the release signal (S5) by the release device 22 of the motor vehicle 10, said release signal can then be transmitted to the control device 20 (S6).

The motor vehicle 10 can be, by way of example, a motor vehicle with a plurality of connection elements 14, wherein each of the connection elements 14 can be covered by a respective covering apparatus 18. The connection elements 14 and, accordingly, the covering apparatus 18, can be distributed over a plurality of sides of the motor vehicle— for example, as shown in the FIGURE, over the sides of the motor vehicle 10 as well as at a radiator of a motor vehicle front end. In charging parks with many charging stations or in a filling station with many fuel pumps, the user of the motor vehicle 10 is therefore at an advantage, because the user can utilize any fuel pump or charging station for recharging and refueling and can park in various parking positions in front of a corresponding energy delivery apparatus 30, without it being necessary, for example, for the user to walk around the vehicle 10 with the charging cable 32 or with the nozzle (not shown in the FIGURE) in order to insert the connecting element 34.

In the example of the FIGURE, the user can park, for example, at the side or in front of the energy delivery apparatus 30. Optionally, for this purpose, the release device 22 of the motor vehicle 10 or of the energy delivery apparatus 30 can determine a motor vehicle side (S7) that is facing the connecting element 34 due to the direction of travel of the motor vehicle 10. For this purpose, for example, the release device 22 of the motor vehicle 10 can read out information data stored in the memory device 26 and thus determine the corresponding information as to the arrangement of the connection element 14 (S8). This information can alternatively be retrieved for the motor vehicle 10, for example, by the release device 22 of the energy delivery apparatus 30.

The information as to a spatial arrangement of the connecting element 34 can be determined, for example, on the basis of map data (S9), wherein the map data can be stored, for example, in the memory device 26 of the release device 22 of the motor vehicle 10. In the example, a suitable motor vehicle side can be, for example, the front end and can be determined on the basis of said data (S7), and the connection element 14 at the radiator of the motor vehicle 10 can be selected (S10). The release signal can then describe the selected connection element 14, so that the control device 20 can actuate the front covering apparatus 18.

For additional information to the user and for enabling the user to establish how best to drive toward the energy delivery apparatus 30, the release device 22 can generate an information signal, such as, for example, an image signal or an audio signal, which, for example, can depict an image of the motor vehicle with the marked position of the selected covering apparatus 18 at the radiator or a corresponding spoken text (S11). The information signal can be transmitted to the screen with the speaker (S12), by way of example, and the output device 28 can emit the information signal (S13).

Through the release signal, the covering apparatus 18—in the example of the FIGURE, the front covering apparatus 18—is released and, for example, opens completely (S14). The user of the motor vehicle 10 can then insert or introduce the connecting element 34 of the energy delivery apparatus 30 into the connection element and recharge or refuel the energy storage unit 12.

After the refueling or recharging, a sensor of the connection element 14 can detect, for example, the unplugging of, by way of example, the charging plug (S15) and can transmit a corresponding signal, which can describe the unplugging, to the release device 22.

Alternatively, for example, a terminal 15 of an ignition unit can determine a starting of the ignition unit and transmit a corresponding sensor signal to the release device 22. In accordance with another alternative, it is possible via geofencing, for example, to determine (S16) that the motor vehicle 10 has again departed from the predetermined radius and, on the basis of this determination, to establish that the energy delivery operation has terminated (S17) and to generate a corresponding closing signal for closing the covering apparatus 18 (S18) and to transmit it to the control device 20 (S19).

Overall, the exemplary embodiments illustrate how, through the invention, a covering apparatus control, such as, for example, a charging flap control, is made possible for electric motor vehicles at public charging points, for example.

In accordance with another exemplary embodiment, a covering apparatus 18 that is designed, for example, as an electrically operated charging flap can, for example, automatically open even during driving up to a charging pole. For the user of the motor vehicle 10, it is not necessary to press a pushbutton in order to open the charging flap; that is, an operating element is thus dispensed with. There also ensues for the user a gain in comfort, because the charging cable only needs to be inserted.

During driving to the exemplary charging pole or to the charging park, it is possible, for example, to provide a display of the output device 28, such as, for example, an instrument cluster and/or a navigation instrument, which informs the user as to the opened charging flap and/or a charging flap position in the case that a plurality of charging flaps are present on the motor vehicle 10.

After the charging, the charging cable 32 only needs to be unplugged and driving can be resumed. The charging flap can optionally automatically re-close during a departure from, by way of example, the charging pole, for example, by way of a departure detection and/or, for example, in that the motor vehicle 10 is driven at more than five kilometers per hour, for example.

For a technical implementation, by way of example, it is possible, in a first variant, for example, to make known the GPS coordinates of the charging pole or of the charging park to the motor vehicle 10 from, for example, geo-objects of user-specific interest ("points of interest") deposited in a vehicle navigation system or, for example, from an online charging pole search. On the basis thereof, the motor vehicle 10 can recognize via geofencing, for example, preferably by use of the release device 22, whether said vehicle is located at a charging pole or in the charging park and can open the exemplary charging flap in a completely automatic manner.

In accordance with a second variant, for example, by way of wireless communication technology, such as, for example Bluetooth, WLAN, infrared, and/or laser, it is possible for the charging flap opening and/or charging flap closing to be initiated directly, for example, by the charging pole, by way of example, or by the charging park. For this purpose, for example, it is possible to dispense with an installed navigation system and/or an installed GPS receiver, and this variant can also be provided for less expensive motor vehicles 10.

Additionally or alternatively to the GPS coordinates, by way of example, another marker can optionally be exploited, which opens only the relevant charging flap when or if a plurality of electrically operated charging flaps are installed in the motor vehicle 10. This can be useful when the user drives the vehicle to a charging pole that, for example, permits charging only at the correct charging flap and/or charging socket, for reasons of space, for example.

The invention claimed is:

1. A method for operating a covering apparatus for covering a connection element of a motor vehicle, wherein the connection element is designed as a junction between an energy delivery apparatus external to the motor vehicle and an energy storage unit and is designed for filling and/or recharging the energy storage unit with an energy source, comprising the following steps carried out by a release device:
    determination that the motor vehicle is located within a predetermined radius of the energy delivery apparatus;
    generation of a release signal, which describes a release of an access to the connection element through opening of the covering apparatus; and
    transmission of the release signal to a control device of the motor vehicle, wherein the control device is set up for controlling the covering apparatus.

2. The method according to claim 1, wherein the release device is a release device of the motor vehicle and carries out the following steps:
    provision of information that describes a location of the energy delivery apparatus; and
    comparison of the described location of the energy delivery apparatus with a current, geographic position of the motor vehicle,
    wherein the determination that the motor vehicle is located within the predetermined radius of the energy delivery apparatus is made depending on the result of the comparison.

3. The method according to claim 1, wherein the determination that the motor vehicle is located within the predetermined radius of the energy delivery apparatus is made through detection of the motor vehicle within the predetermined radius by way of a detection device of the energy delivery apparatus.

4. The method according to claim 1, further comprising:
    determination of a termination of an energy delivery operation, preferably through determination of a predetermined minimum speed of the motor vehicle; and/or determination that the motor vehicle is departing the energy delivery apparatus;

depending on the determined termination of the energy delivery operation or depending on the determined departure from the energy delivery apparatus: generation of a closing signal, which describes a covering of the connection element by the covering apparatus prior to beginning driving; and transmission of the generated closing signal to the control device.

5. The method according to claim 1, further comprising:

determination of a motor vehicle side that, for the energy delivery operation, is facing a connecting element of the energy delivery apparatus, which is designed for connection to the connection element and for delivery of the energy source to the energy storage unit;

determination of a particular spatial arrangement of a plurality of connection elements on the motor vehicle; and depending on the particular spatial arrangement of the particular connection element: selection of at least one of the connecting elements that is located on the determined motor vehicle side, wherein the generated release signal describes a release of the covering apparatus that covers the at least one selected connection element.

6. The method according to claim 5, wherein the release device determines a spatial arrangement of the connecting element at the energy delivery device based on map data, and in that the determination of the motor vehicle side depends on the determined spatial arrangement of the connecting element.

7. The method according to claim 5, further comprising:

generation of an information signal, which describes the covering apparatus of the selected connection element and its spatial arrangement on the motor vehicle; and transmission of the generated information signal to an output device of the motor vehicle for emitting the information signal.

8. A release device, which is set up to carry out the method steps in accordance with claim 1, the release device preferably having a processor device.

9. An energy delivery apparatus, which is preferably designed as a fuel pump or charging station, wherein the energy delivery apparatus has a release device according to claim 8.

10. A motor vehicle, comprising an energy storage unit and a covering apparatus of the energy storage unit, as well as a connection element, which is designed as a junction between an energy delivery apparatus external to the motor vehicle and is designed for filling and/or recharging the energy storage unit, preferably wherein the energy storage unit is designed as a fuel tank and/or as a battery unit, and in that the covering apparatus is designed as a charging flap and/or as a fuel tank cover, the motor vehicle having a release device according to claim 8.

* * * * *